United States Patent
Schoenfeld et al.

(10) Patent No.: US 6,207,240 B1
(45) Date of Patent: Mar. 27, 2001

(54) LASER MARKING OF EFFECT COATINGS

(75) Inventors: Axel Schoenfeld, Wiesbaden; Andreas Stohr, Kriftel; Hans Joachim Metz, Darmstadt, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/373,804

(22) Filed: Aug. 13, 1999

(30) Foreign Application Priority Data

Aug. 14, 1998 (DE) .............................. 198 36 885

(51) Int. Cl.$^7$ ........................................ B05D 3/00
(52) U.S. Cl. .................. 427/555; 427/554; 264/435; 264/482; 264/492
(58) Field of Search ................ 427/554, 555; 264/1.37, 1.38, 435, 437, 482, 492

(56) References Cited

U.S. PATENT DOCUMENTS

| | | | |
|---|---|---|---|
| 4,412,059 | * 10/1983 | Krigbaum | 427/163 |
| 4,515,867 | * 5/1985 | Bleacher et al. | 425/555 |
| 5,397,686 | * 3/1995 | Dominick et al. | 425/555 |
| 5,409,742 | * 4/1995 | Arfsten et al. | 425/555 |
| 5,599,869 | 2/1997 | Kurz . | |
| 5,747,175 | 5/1998 | Dietz et al. . | |
| 5,834,064 | 11/1998 | Dietz et al. | 427/388.1 |
| 5,837,160 | 11/1998 | Dietz et al. | 252/299.01 |
| 5,855,968 | * 1/1999 | Hirata et al. | 425/555 |
| 5,855,969 | * 1/1999 | Robertson | 425/555 |
| 5,985,377 | * 11/1999 | Corbett | 425/555 |
| 6,017,984 | 1/2000 | Schönfeld et al. | 524/190 |

FOREIGN PATENT DOCUMENTS

| | | |
|---|---|---|
| 19612973 | 10/1997 | (DE) . |
| 19643277 | 4/1998 | (DE) . |
| 0447032 | 9/1991 | (EP) . |
| 0641821 | 3/1995 | (EP) . |
| 0738906 | 10/1996 | (EP) . |
| 2130526 | 6/1984 | (GB) . |

OTHER PUBLICATIONS

Derwent Publication Ltd., London, GB, Class A35, AN month unclear 1995–011481, XP–002122843.
Derwent Information Ltd., Abstract.
EPO Search Report.
HAWLEY'S Condensed Chemical Dictionary, 13th ed/revised by Richard J. Lewis, Sr., ® 1997 by John Wiley & Sons, Inc., definition of "cholesteric" p. 265 No Month.

* cited by examiner

*Primary Examiner*—Marianne Padgett
(74) *Attorney, Agent, or Firm*—Susan S. Jackson; Scott E. Hanf

(57) ABSTRACT

The invention relates to a process for generating a marking on an effect coating or molding compound comprising cholesteric liquid-crystalline main-chain or side-group polymers or comprising a combination of main-chain and side-group polymers, which comprises inducing a color change at the irradiated sites of the effect coating or molding compound by laser irradiation.

16 Claims, No Drawings

LASER MARKING OF EFFECT COATINGS

CROSS-REFERENCE TO RELATED APPLICATION

The present invention is described in the German priority application No. 198 36 885.2 filed Aug. 14, 1998.

BACKGROUND OF THE INVENTION

The invention relates to a process for producing symbols by laser irradiation on effect coatings or molding compounds comprising thermoplastic cholesteric liquid-crystal polymers (cLCPs) having optically variable properties.

It is known to inscribe surfaces of plastic by means of laser radiation, and in this context use is made, in addition to $CO_2$ lasers, preferably of Nd:YAG lasers (wavelength 1064 nm) or a frequency-doubled Nd:YAG laser (532 nm). In the case of the laser markings customary at present, the marking mechanism is normally a thermal process (N. J. Bruton, Opt. Photonics News (1997), 8(5), 24–30). The absorbed laser light induces a rapid local temperature rise in the polymer material at the irradiated sites. The polymer material pyrolyzes and a marking becomes visible. In the case of polymers which are transparent to the light wavelength used it is necessary to use light-absorbing additives, such as kaolin.

Initially, only light-colored inscriptions on a dark background or dark inscriptions on a light-colored background were possible. Through the incorporation of colored pigments which are not destroyed by the laser irradiation, it is possible to generate colored laser markings (EP 0 641 821 A1).

The laser markings known to date are therefore distinguished by the fact that they possess, on a white or colored polymer, a marking in a different color. Neither the color of the plastic nor that of the inscription, however, possesses any viewing-angle dependency. Cholesteric main-chain polymers (cLCPs) are known and can be prepared in analogy to nematic main-chain polymers by using an additional chiral comonomer (U.S. Pat. No. 4,412,059; EP-A-0 196 785; EP-A-0 608 991; EP-A-0 391 368) or by reacting nematic main-chain polymers (LCPS) with additional chiral comonomers (EP-A-0 283 273). A feature of cholesteric main-chain polymers is their helical superstructure. As a result of this, first, the material no longer has the anisotropy of the mechanical properties which is typical of nematic liquid-crystal polymers. Depending on the chiral monomer content, the material exhibits pronounced color effects which are based on the selective reflection at the helical superstructure. The precise reflection color in this case depends on the viewing angle and above all on the pitch of the helix. For any given viewing angle—for example, a sample viewed vertically from above—the reflection color which appears is a color having a wavelength which corresponds to the pitch of the helical superstructure. This means that the wavelength of light reflected is shorter the smaller the pitch of the helix. The developing pitch of the helix depends essentially on the proportion of the chiral comonomer, on the nature of its incorporation into the polymer, on the degree of polymerization, and on the structure of the chiral comonomer.

Thin films of cholesteric liquid crystals exhibit pronounced color effects when applied to an absorbent substrate, especially a black substrate, since otherwise, owing to an inadequately pronounced hiding power of the cholesteric liquid crystals, the nonselective component of the light is reflected at the substrate, which attenuates the perceived color. It is known, furthermore, that instead of a black substrate it is also possible to use substrates colored otherwise. In addition, it is possible to influence the hiding power and perceived color of the cholesteric layer by the incorporation of colorants (DE-A-196 43 277).

SUMMARY OF THE INVENTION

It is an object of the present invention to bring about color changes in viewing-angle dependent effect coatings or molding compounds by means of laser irradiation, and thus to induce markings in the form of symbols which given an appropriate choice of color may even be perceptible only at certain viewing angles.

It has surprisingly been found that this object can be achieved through the use of cholesteric liquid-crystalline polymers. An advantage over systems common at present is that the reflection properties of the effect polymer to be marked give it a viewing-angle dependent color, and it is therefore possible not only to produce colored markings on polymers but also, by virtue of the laser marking, to induce a color change in a viewing-angle dependent coating.

DESCRIPTION OF THE PREFERRED EMBODIMENTS

The present invention provides a process for generating a marking on an effect coating or molding compound comprising cholesteric liquid-crystalline main-chain or side-group polymers or comprising a combination of main-chain and side-group polymers, which comprises inducing a color change at the irradiated sites of the effect coating or molding compound by laser irradiation.

If a thin layer of the abovementioned cholesteric liquid-crystal polymers, which is applied to a substrate, is irradiated with a laser, the cholesteric arrangement of the liquid-crystal polymers is destroyed at the irradiated sites and, depending on the duration and intensity of irradiation, the substrate surface becomes more or less visible. If the substrate surface is colored, either colored right through or colored by means of a colored coating, the substrate color becomes visible and perceptible as a marking. Thus, for example, by laser irradiation of an effect coating which appears green when viewed perpendicularly and blue when viewed at an oblique angle, and has been applied to a black-coated metal panel, it is possible to generate a dark marking. This marking is therefore perceptible on the effect coating at any viewing angle.

However, it is also possible to adapt the background color of the substrate to the viewing-angle dependent colors of the cholesteric polymer. By this means it is possible for the marking to become visible only at a particular viewing angle. If the effect coating is such, for example, that it appears green when viewed perpendicularly and blue when viewed at an oblique angle, the chosen background color can be green or blue. If the background color is green, then the site marked with the laser is likewise green and the marking is perceptible only with difficulty when viewed perpendicularly owing to the lack of contrast. If, however, the coating is viewed at an oblique angle, the color of the effect coating appears blue, while the laser-marked site remains green and therefore becomes visible.

If it is desired that the marking should be visible when viewed perpendicularly but invisible when viewed at an oblique angle, the chosen background color must be blue in the above example.

If a molding compound comprising said cLCPs is marked with the laser, then depending on the duration and intensity of irradiation the perceived color of the nonoriented polymer is produced at the irradiated sites, i.e., a milky/cloudy color in the case of a polymer which has not been colored with the colorants below, or a gray or black marking induced by pyrolysis products.

The color of the laser marking can be influenced not only by the color of the substrate but also by the incorporation into the effect polymer of colorants which are stable with respect to the laser marking. A red pigment, for example, can be incorporated into an effect polymer which exhibits a flop from green to blue, for example. The effect coating or molding compound is irradiated with a laser until the color of the colorant becomes visible at the irradiated site.

Colorants which can be used are compounds from the series of the organic and inorganic pigments and from the series of the polymer-soluble dyes. Examples of inorganic pigments are titanium dioxide, iron oxides, metal oxide mixed-phase pigments, cadmium sulfides, ultramarine blue pigments or chromate-molybdate pigments. Organic pigments which can be employed are all pigments sufficiently well known to the person skilled in the art from the relevant literature, examples being carbon black, anthanthrone, dioxazine, phthalocyanine, quinacridone, diketopyrrolopyrrole, perylene, perinone, azomethine, isoindoline and azo pigments. Examples of suitable dyes are quinophthalone, perinone, anthraquinone, azomethine complex, azlactone and azo dyes. The dyes can be dissolved fully or partly in the cholesteric liquid-crystal polymer.

In order to obtain specific coloristic effects, it is also possible to employ mixtures of different pigments or dyes, or mixtures of dyes with pigments, as the colorants.

The radiation employed in accordance with the invention is generally produced with the aid of a commercially available laser. The wavelength of the radiation lies in general within the range between 150 and 1500 nm, preferably in the range from 150 to 1100 nm. Suitable lasers are preferably $CO_2$ lasers, Nd:YAG lasers, frequency-tripled Nd:YAG lasers (355 nm wavelength), frequency-quadrupled Nd:YAG lasers (266 nm wavelength) or UV lasers. Particularly suitable UV lasers are excimer lasers, such as $F_2$ excimer lasers (157 nm wavelength), ArF excimer lasers (193 nm wavelength), KrCl excimer lasers (222 nm wavelength), KrF excimer lasers (248 nm wavelength), XeCl excimer lasers (308 nm wavelength), and XeF excimer lasers (351 nm wavelength).

Particular preference is given to Nd:YAG lasers (532 or 1064 nm wavelength), KrF lasers (248 nm wavelength), and XeCl lasers (308 nm wavelength). Where pulsed lasers are used, suitable pulse frequencies are between 0.1 and 10,000 Hz, preferably between 0.5 and 5000 Hz and, in particular, between I and 1000 Hz. The pulse lengths lie within the range from 0.1 to 1000 ns, preferably in the range from 0.5 to 350 ns and, in particular, in the range from I to 100 ns.

The lasers generally have an energy density of between 0.3 mJ/cm$^2$ and 50 J/cm$^2$, preferably between 0.5 mJ/cm$^2$ and 20 J/cm$^2$, and, in particular, between 1 mJ/cm$^2$ and 10 J/cm$^2$.

The duration of radiation is between 1 millisecond and 30 seconds depending on the laser used and on the laser energy.

The thermoplastic cholesteric polymers which can be employed in accordance with the invention include not only cholesteric liquid-crystalline main-chain polymers but also cholesteric liquid-crystalline side-group polymers and combined liquid-crystalline main-chain/side-group polymers.

Examples of cholesteric liquid-crystalline side-group polymers are polysiloxanes, cyclic siloxanes, polyacrylates or polymethacrylates having mesogens in the side groups. The mesogens in the side group are, for example, cholesterol-substituted phenylbenzoates or biphenols.

The main-chain polymers are preferably liquid-crystalline polyesters, polyamides or polyesteramides which comprise aromatic and/or cycloaliphatic hydroxycarboxylic acids, aromatic aminocarboxylic acids; and/or aromatic and/or cycloaliphatic dicarboxylic acids, and aromatic and/or cycloaliphatic diols and/or diamines; and also chiral, bifunctional comonomers.

Cholesteric liquid-crystalline main-chain polymers are generally prepared from a chiral component and from hydroxycarboxylic acids and/or a combination of dicarboxylic acids and diols. The polymers generally consist essentially of aromatic components. It is, however, also possible to employ aliphatic and cycloaliphatic components, such as cyclohexanedicarboxylic acid, for example.

Preferred cholesteric polymers for the purposes of the present invention are cholesteric liquid-crystalline main-chain polymers consisting essentially of a) from 0 to 99.8 mol % of one or more compounds from the group of the aromatic hydroxycarboxylic acids, cycloaliphatic hydroxycarboxylic acids and aromatic aminocarboxylic acids;

b) from 0 to 50 mol % of one or more compounds from the group of the aromatic dicarboxylic acids and cycloaliphatic dicarboxylic acids;

c) from 0 to 50 mol % of one or more compounds from the group of the aromatic and cycloaliphatic diols and diamines;

d) from 0.1 to 40 mol %, preferably from 1 to 25%, of chiral, bifunctional comonomers; the overall sum being 100 mol % and the sum of a), b) and c) being from 60 to 99.9 mol %.

With regard to the stated percentages, care should be taken that the stoichiometry of the functional groups for polycondensation is ensured, this stoichiometry being known to the person skilled in the art. In addition, the polymers may also include components having only one functional group or having more than two functional groups, such as dihydroxybenzoic acid, trihydroxybenzenes or trimellitic acid, for example. In this way it is possible to influence the molecular weight of the polymers.

The components having more than two functional groups act as a branching site in the polymer and should be added only in low concentrations, for example, from 0 to 5 mol %, if crosslinking of the material in the course of the condensation is to be avoided.

Particular preference is given to cholesteric main-chain polymers which are composed of the following building blocks from the individual monomer groups:

a) aromatic hydroxycarboxylic acids, aminocarboxylic acids:

hydroxybenzoic acids, hydroxynaphthalenecarboxylic acids, hydroxy-biphenylcarboxylic acids, aminobenzoic acids, hydroxycinnamic acids b) aromatic dicarboxylic acids, aliphatic dicarboxylic acids:

terephthalic acid, isophthalic acid, biphenyldicarboxylic acids, naphthalene-dicarboxylic acids, cyclohexanedicarboxylic acids, pyridinedicarboxylic acids, diphenyl ether dicarboxylic acids, carboxycinnamic acids,

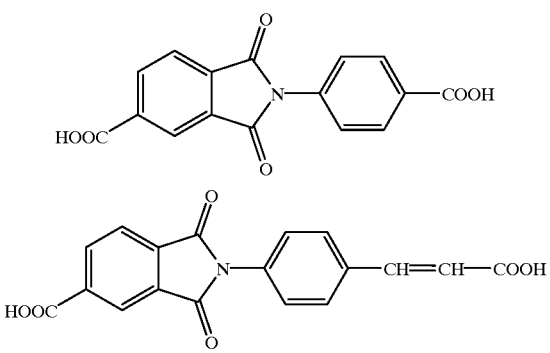

c) aromatic diols, aminophenols, diamines:
hydroquinones, dihydroxybiphenyls, tetramethyldihydroxybiphenyls, naphthalenediols, dihydroxydiphenyl sulfones, dihydroxydiphenyl ethers, dihydroxyterphenyls, dihydroxydiphenyl ketones, phenylenediamines, diaminoanthraquinones, dihydroxyanthraquinones, and

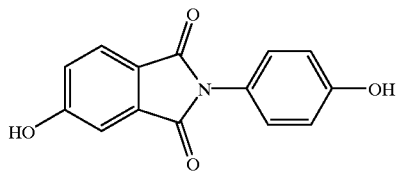

d) chiral, bifunctional monomers:
isosorbide, isomannide, isoidide, camphoric acid, (D)- or (L)-methylpiperazine, (D)- or (L)- 3-methyladipic acid, butane-2,3-diol and also

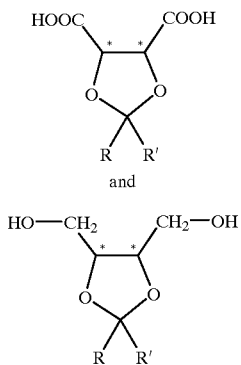

where R and R' in each case independently of one another are H, $C_1$–$C_6$-alkyl or phenyl, preferably H or $CH_3$.

When sulfonic acid groups are used as functional group for the condensation it can be advantageous to employ them in an activated form: for example, as the sulfochloride or as sulfonic esters.

Instead of the substances specified it is also possible to employ other structural isomers or derivatives of these substances. For example, in place of N-(4-Hydroxyphenyl) trimellitimide it is also possible to employ aminophenol and trimellitic anhydride.

The polymer building blocks described may also include further substituents, such as methyl, methoxy, cyano or halogen, for example.

For the purposes of the present invention, very particular preference is given to polymers comprising one or more monomers from the group p-hydroxybenzoic acid, 2-hydroxy-6-naphthoic acid, terephthalic acid, isophthalic acid, 2,6-naphthalenedicarboxylic acid, hydroquinone, resorcinol and 4,4'-dihydroxybiphenyl and also camphoric acid, isosorbide and isomannide as chiral component.

The polycondensation can be conducted by any customary method. A suitable example is a melt condensation with acetic anhydride that is described, for example, in EP-A-0 391 368. Condensation with acetic anhydride is also possible in solution or in disperse or emulsified phase. The monomers are preferably linked by way of ester linkages (polyester), amide linkages (polyester amide/polyamide) and/or imide linkages (polyester imide/polyimide), but may also be linked by way of other known linkage types.

In the selection of the monomer building blocks care should be taken to ensure the functional-group stoichiometry known to the person skilled in the art; in other words, to ensure that functional groups which react with one another in the polycondensation reaction are employed in corresponding molar proportions. When using dicarboxylic acids and diols, for example, the number of hydroxyl groups present must correspond to the number of carboxyl groups. However, it is also possible to employ specific excesses of functional groups, for example, more carboxyl groups than hydroxyl groups, in order thus to control, for example, the attainable molecular weight.

In place of the carboxylic acids it is also possible to employ carboxylic acid derivatives, such as acid chlorides or carboxylic esters, for example. In place of the hydroxy components it is also possible to employ corresponding hydroxy derivatives, such as the acetylated hydroxy compounds, for example.

The cholesteric liquid-crystalline polymers may also include crosslinkable groups, so that it is possible to fix an oriented liquid-crystal polymer by photocrosslinking, for example.

In one preferred embodiment the cLCPs have a very low solubility, which means that their molecular weights cannot be determined by commercially customary methods (GPC, light scattering). As a measure of the molecular weight it is possible to use the intrinsic viscosity of the polymers in a solution comprising pentafluorophenol/hexafluoroisopropanol. Suitable polymers are those having an intrinsic viscosity of between 0.1 and 10 dl/g at a temperature of 25° C.

The cholesteric liquid-crystal polymers described above can be employed directly for the purposes of the invention. Alternatively, it is possible to prepare blends of the cholesteric liquid-crystalline polymers. The blends can consist of different cholesteric liquid-crystalline polymers, although it is also possible to mix the cholesteric liquid-crystalline polymers with cholesteric or nematic polymers.

The quantitative ratios between the cholesteric liquid-crystalline polymer and the colorants described above, where present, can vary within wide limits and are dependent on the nature of the colorant and on the particular color effect desired. In general, a colored polymer will comprise from 0.1 to 10% by weight of colorant. Furthermore, it is possible for from 0 to 10% by weight, preferably from 0 to 5% by weight, based on the overall weight, of customary auxiliaries and additives from the group of the leveling additives (e.g., polyacrylates, polyesters, as used in powder coating systems), stabilizers (e.g., UV stabilizers or heat stabilizers, antioxidants), antistats and optical brighteners to be present in the cholesteric liquid-crystal polymer.

Colorants, auxiliaries and additives are mixed with the cholesteric liquid-crystal polymer until distribution is homogeneous. Mixing takes place most advantageously in the melt of the cholesteric liquid-crystal polymer. Mixing can be carried out with any suitable mixing equipment, examples being dispersion kneaders, Banbury kneaders or screw kneaders, or by extrusion, for example, in a single-screw or twin-screw extruder. In the case of extrusion in particular it is also possible to start from a pulverulent mixture of the additives with the cholesteric liquid-crystalline polymer.

The colorant can also be added directly during the preparation of the cholesteric liquid-crystalline polymer, judiciously toward the end of the polycondensation reaction and, preferably, directly prior to the discharge of the finished polymer.

A further possibility is to incorporate the colorant in the form of a masterbatch into the cholesteric liquid-crystal polymer. Vehicles employed for a masterbatch can be synthetic and natural waxes, polymers and rubbers. The preferred vehicle for a masterbatch, however, is the cholesteric liquid-crystal polymer itself. The masterbatch can comprise one pigment or one dye or else a mixture of different pigments and/or dyes. Further auxiliaries and/or additives can also be incorporated into the masterbatch. The preparation of such masterbatches can be carried out by any known technique: for example, by intimate mixing of the colorants with the vehicle in the melt in suitable mixing equipment, examples being dispersion kneaders, Banbury kneaders and screw kneaders, e.g., twin-screw extruders.

Coloring of the cholestoric liquid-crystalline polymer with the masterbatch can be effected by mixing the two materials and then extruding the mixture. The masterbatch can also be metered as a melt into the melt of the cholesteric liquid-crystal polymer via a side extruder and/or a melt pump. At its most economic, this is done as the cholesteric liquid-crystalline polymer is discharged from the reactor following polycondensation.

The colored liquid-crystalline polymers prepared by the processes described above are normally present as a physical mixture of colorant and polymer. Since relatively high temperatures are also used, generally, in the course of the preparation process, at least partial incidence of chemical bonding to the cholesteric liquid-crystalline polymer cannot be ruled out in the case of colorants having functional groups such as carboxyl, sulfo or hydroxyl.

The laser markings produced with the process of the invention are particularly suitable in fields where to date customary printing techniques have been employed for coating. They are particularly suitable in the field of security markings, such as for marking banknotes, certificates, entry cards, etc. or for marking articles provided with effect coatings.

EXAMPLES

Examples of Cholesteric Liquid-Crystal Polymers

Example A

103 Mol of acetic anhydride are added to 30 mol of 2-hydroxy-6-naphthoic acid, 50 mol of 4-hydroxybenzoic acid, 10 mol of terephthalic acid, 2 mol of 4,4'-dihydroxybiphenyl and 8 mol of 1,4:3,6-dianhydro-D-soribtol (isosorbide) in a reactor and the mixture is flushed with a gentle stream of nitrogen. It is then heated to 140° C. over 15 minutes with stirring and this temperature is maintained for 30 minutes. The temperature is subsequently raised to 325° C. over the course of 165 minutes and the melt is stirred further at this temperature for 30 minutes. Acetic acid begins to distil off from about 220° C. Thereafter, the nitrogen flushing is terminated and reduced pressure is slowly applied. The melt is stirred under reduced pressure (about 5 mbar) for a further 30 minutes. It is blanketed with nitrogen and the polymer is discharged with an extruder and pelletized. The polymer has a bright green color which appears blue when viewed at an oblique angle. The color appears as early as during the condensation under reduced pressure, and is retained after cooling.

For incorporation of a blue pigment, the polymer is kneaded at 240° C. for 30 minutes with 1.5% C.I. Pigment Blue 15:1 (C.I. No. 74 160).

Example B

103 Mol of acetic anhydride are added to 17 mol of 2-hydroxy-6-naphthoic acid, 50 mol of 4-hydroxybenzoic acid, 20 mol of 4,4'-dihydroxybiphenyl and 13 mol of camphoric acid in a reactor and the mixture is flushed with a gentle stream of nitrogen. It is then heated to 140° C. over 15 minutes with stirring and this temperature is maintained for 30 minutes. The temperature is subsequently raised to 325° C. over the course of 165 minutes and the melt is stirred further at this temperature for 30 minutes. Acetic acid begins to distil off from about 220° C. Thereafter, the nitrogen flushing is terminated and reduced pressure is slowly applied. The melt is stirred under reduced pressure (about 5 mbar) for a further 30 minutes. It is then blanketed with nitrogen and the polymer is discharged with an extruder and pelletized.

The polymer has a bright, reddish yellow color which appears bluish green when viewed at an oblique angle. The color appears as early as during the condensation under reduced pressure, and is retained after cooling.

Examples for producing markings in effect coatings:

EXAMPLE 1

The cholesteric liquid-crystal polymer employed is the colored polymer described in Example A.

The cLCP granules are ground in an ultracentrfugal mill with a 0.1 mm sieve. The milled material is subsequently classified, the classifier setting preferably being chosen such that the mean particle size is between 5 and 10 μm. The classified material is used to prepare, by stirring, a 35% by weight dispersion in isobutanol. The dispersion is applied to a black-painted metal panel using a coating bar whose gap width is 24 μm. After the applied dispersion has dried, the powder is stoved at 280° C. for 5 minutes. The film exhibits a green color which appears blue when viewed at an oblique angle. The cLCP layer is very well formed and homogeneous. An Nd:YAG laser is used to apply the word "TEST"

as a marking to the layer. As a result of the laser irradiation, the LCP pyrolyzes and the blue pigment color remains. When viewed perpendicularly, the effect coating appears green and the word "TEST" can be read as blue text. When viewed obliquely, the effect coating appears blue and the word "TEST" is unreadable owing to the absence of contrast.

EXAMPLE 2

The cholesteric liquid-crystal polymer employed is the polymer described in Example B.

The cLCP granules are ground in an ultracentrifugal mill with a 0.1 mm sieve. The milled material is subsequently classified, the classifier setting preferably being chosen such that the mean particle size is between 5 and 10 μm. The classified material is used to prepare, by stirring, a 35% by weight dispersion in isobutanol. The dispersion is applied to a black-painted metal panel using a coating bar whose gap width is 24 μm. After the applied dispersion has dried, the powder is stoved at 280° C. for 5 minutes. The film exhibits a yellow color which appears greenish blue when viewed at an oblique angle. The cLCP layer is very well formed and homogeneous.

An Nd:YAG laser is used to apply the word "TEST" as a marking to the layer. As a result of the laser irradiation, the LCP pyrolyzes and the black substrate coating becomes visible. When viewed perpendicularly, the effect coating appears reddish yellow and the word "TEST" can be read as black text. When viewed obliquely, the effect coating appears greenish blue and the word "TEST" is still legible as black text.

What is claimed is:

1. A process for generating a marking on a coating of a substrate or on a molding compound, wherein the coating or the molding compound consists essentially of a polymer selected from the group consisting of a cholesteric liquid-crystalline main-chain polymer, a cholesteric liquid-crystalline side-group polymer, and a combination of said polymers, said process comprising inducing a color change on the coating or the molding compound by irradiation at an irradiated site with a laser light until a milky or a cloudy color, or a gray or a black color becomes visible at the irradiated site of the molding compound or until the substrate becomes visible at the irradiated site.

2. The process as claimed in claim 1, wherein the cholesteric liquid-crystaline main-chain polymer consists of
   a) from 0 to 99.8 mol % of one or more compounds selected from the group consisting of aromatic hydroxycarboxylic acids, cycloaliphatic hydroxycarboxylic acids and aromatic aminocarboxylic acids;
   b) from 0 to 50 mol % of one or more compounds selected from the group consisting of aromatic dicarboxylic acids and cycloaliphatic dicarboxylic acids;
   c) from 0 to 50 mol % of one or more compounds selected from the group consisting of aromatic diols, aromatic diamines, cycloaliphatic diols and cycloaliphatic diamines;
   d) from 0.1 to 40 mol % of a chiral, bifunctional comonomer selected from the group consisting of isosorbide, isomannide, isoidide, camphoric acid, (D)-methylpiperazine, (L)-methylpiperazine, (D)-methyladipic acid, (L)-methyladipic acid, butane-2,3-diol.

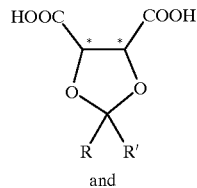

and

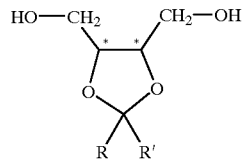

where R and R', independently of one another, are H, $C_1$–$C_6$-alkyl or phenyl; the overall sum being 100 mol % and the sum of a), b), and c) being from 60 to 99.9 mol %.

3. The process as claimed in claim 1, wherein the laser light has a wavelength between 150 and 1500 nm.

4. The process as claimed in claim 1, wherein the laser light has a wavelength between 150 and 1100 nm.

5. The process as claimed in claim 1, wherein the laser light has an energy density between 0.3 mJ/cm$^2$ and 50 J/cm$^2$.

6. The process as claimed in claim 1, wherein the laser light has an energy density between 1 mJ/cm$^2$ and 10 J/cm$^2$.

7. The process as claimed in claim 1, wherein the irradiation has a duration of from 1 ms to 30 s.

8. A process for generating a marking on a coating of a substrate or on a molding compound, wherein the coating or the molding compound consists essentially of a colorant which is stable with respect to laser light and a polymer selected from the group consisting of a cholesteric liquid-crystalline main-chain polymer, a cholesteric liquid-crystalline side-group polymer, and a combination of said polymers, said process comprising inducing a color change on the coating or the molding compound by irradiation at an irradiated site with a laser light until a color of the colorant becomes visible at the irradiated site.

9. The process as claimed in claim 8, wherein the cholesteric liquid-crystalline main-chain polymer consists of
   a) from 0 to 99.8 mol % of one or more compounds selected from the group consisting of aromatic hydroxycarboxylic acids, cycloaliphatic hydroxycarboxylic acids and aromatic aminocarboxylic acids;
   b) from 0 to 50 mol % of one or more compounds selected from the group consisting of aromatic dicarboxylic acids and cycloaliphatic dicarboxylic acids;
   c) from 0 to 50 mol % of one or more compounds selected from the group consisting of aromatic diols, aromatic diamines, cycloaliphatic diols and cycloaliphatic diamines;

d) from 0.1 to 40 mol % of a chiral, bifunctional comonomer selected from the group consisting of isosorbide, isomannide, isoidide, camphoric acid, (D)-methylpiperazine, (L)-methylpiperazine, (D)-methyladipic acid, (L)-methyladipic acid, butane-2,3-diol,

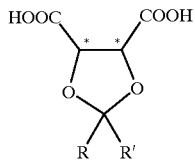

and

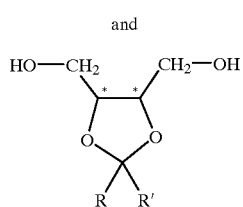

where R and R', independently of one another, are H, $C_1$–$C_6$-alkyl or phenyl; the overall sum being 100 mol % and the sum of a), b), and c) being from 60 to 99.9 mol %.

10. The process as claimed in claim 8, wherein the colorant is an organic pigment, an inorganic pigment, or a polymer-soluble dye.

11. The process as claimed in claim 10, wherein the organic pigment is selected from the group consisting of carbon black, anthanthrone, dioxazine, phthalocyanine, quinacridone, diketopyrrolpyrrole, perylene, perinone, azomethine, isoindoline and azo pigments.

12. The process as claimed in claim 8, wherein the laser light has a wavelength between 150 and 1500 nm.

13. The process as claimed in claim 8, wherein the laser light has a wavelength between 150 and 1100 nm.

14. The process as claimed in claim 8, wherein the laser light has an energy density between 0.3 mJ/cm$^2$ and 50 J/cm$^2$.

15. The process as claimed in claim 8, wherein the laser light has an energy density between 1 mJ/cm$^2$ and 10 J/cm$^2$.

16. The process as claimed in claim 8, wherein the irradiation has a duration of from 1 ms to 30 s.

* * * * *